United States Patent
Crump

(10) Patent No.: US 9,188,203 B2
(45) Date of Patent: Nov. 17, 2015

(54) VARIABLE FLOW CHECK VALVE FOR HYDRAULIC TENSIONER

(75) Inventor: Matthew W. Crump, Cortland, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 261 days.

(21) Appl. No.: 13/985,052

(22) PCT Filed: Feb. 27, 2012

(86) PCT No.: PCT/US2012/026688
§ 371 (c)(1),
(2), (4) Date: Aug. 13, 2013

(87) PCT Pub. No.: WO2012/118723
PCT Pub. Date: Sep. 7, 2012

(65) Prior Publication Data
US 2013/0331214 A1 Dec. 12, 2013

Related U.S. Application Data

(60) Provisional application No. 61/447,342, filed on Feb. 28, 2011.

(51) Int. Cl.
*F16H 7/08* (2006.01)
*F16K 15/18* (2006.01)
*F16K 15/04* (2006.01)

(52) U.S. Cl.
CPC ............... *F16H 7/08* (2013.01); *F16H 7/0848* (2013.01); *F16K 15/042* (2013.01); *F16K 15/044* (2013.01); *F16K 15/18* (2013.01); *F16H 2007/0806* (2013.01); *F16H 2007/0812* (2013.01); *F16H 2007/0859* (2013.01); *Y10T 137/0508* (2015.04); *Y10T 137/7837* (2015.04)

(58) Field of Classification Search
CPC ................ F16H 2007/0806; F16H 2007/0812; F16H 2007/0859; F16H 7/08; F16H 7/0848; F16K 15/042; F16K 158/044; F16K 15/18
USPC ................................ 474/110; 137/511, 15.22
See application file for complete search history.

(56) References Cited

U.S. PATENT DOCUMENTS 1,613,145 A * 1/1927 Trump ........................ 137/512.1
2,308,876 A 1/1943 Hammett
(Continued)

FOREIGN PATENT DOCUMENTS

WO 03008849 A1 1/2003

*Primary Examiner* — William E Dondero
*Assistant Examiner* — Robert T Reese
(74) *Attorney, Agent, or Firm* — Helmholdt Law PLC; Thomas D. Helmholdt

(57) ABSTRACT

A variable flow check valve (30) and method of manufacture thereof can include a housing (36) defining an inlet passage (38) communicating with a plurality of valve seats (32) and a ball-guiding passage (40) adjacent each valve seat (32). A plurality of balls (42) is provided; one ball (42) for each valve seat (32). Each ball (42) engages within a ball-guiding passage (40) for reciprocal movement with respect to a corresponding valve seat (32) and is normally biased toward the corresponding valve seat (32). At least two of the plurality of balls (42) have at least one different fluid flow characteristic selected from a group including a size of each ball, an allowable ball travel distance for each ball, and an amount of biasing force applied to each ball. The check valve (30) can be combined with a hydraulic tensioner (10) for an endless, flexible, power transmission member (12) for an internal combustion engine of a motor vehicle.

15 Claims, 3 Drawing Sheets

(56) References Cited

U.S. PATENT DOCUMENTS

| | | |
|---|---|---|
| 4,018,247 A | 4/1977 | Carr |
| 4,253,524 A | 3/1981 | Erickson |
| 4,483,363 A * | 11/1984 | Madoche et al. ........ 137/329.04 |
| 5,700,213 A * | 12/1997 | Simpson et al. ............. 474/110 |
| 7,404,776 B2 * | 7/2008 | Yoshida ....................... 474/110 |
| 7,427,249 B2 | 9/2008 | Yoshida |
| 2005/0227799 A1 | 10/2005 | Yoshida |
| 2008/0029165 A1 | 2/2008 | Beck |
| 2008/0261737 A1 | 10/2008 | Yoshida et al. |

* cited by examiner

VARIABLE FLOW CHECK VALVE FOR HYDRAULIC TENSIONER

FIELD OF THE INVENTION

The invention relates to a check valve apparatus and method of manufacture, and more particularly to a hydraulic tensioner for applying proper tension to an endless, flexible, power transmission member, such as a timing belt or timing chain, encircling a driving sprocket and at least one driven sprocket as used for an internal combustion engine of a motor vehicle.

BACKGROUND

Chain tensioners in engines are used to control the power transmission chains as the chain travels around a plurality of sprockets. The slack of the chain varies as the temperature in an engine increases and as the chain wears. When a chain wears, the chain elongates and the slack in the chain increases. The increase in slack may cause noise, slippage, or tooth jumping between the chain and the sprocket teeth. If the increase of the slack of the chain is not taken up, by a tensioner for example, in an engine with a chain driven camshaft, the engine may be damaged because the camshaft timing is misaligned by several degrees due to slippage or tooth jumping.

The performance of a hydraulic tensioner is based on two primary functions of a check valve. First, oil must flow through a check valve and into a high pressure chamber of the tensioner as the piston extends to take up chain slack. If the flow restriction of the check valve is too great, the piston will not have enough oil volume to support its extended length. Secondly, as the chain begins to push the piston back into the tensioner the oil wants to flow back out of the check valve. At this point the check valve ball must move back to seal off the oil passage. If the response time is to slow it takes longer to build up the necessary pressure to support the piston and chain control becomes an issue.

Hydraulic tensioner check valves have been previously disclosed in U.S. Pat. No. 7,404,776; U.S. Pat. No. 7,427,249; and U.S. Published Application No. 2008/0261737. Current singular check valve ball technology is limited in its ability to provide variable flow. This technology has two methods of increasing flow. The first option is to increase the diameter of the ball which increases the conical flow area between the seat and ball. The adverse effect of increasing the ball diameter is that the balls mass also increases. As the mass of the ball increases the response time to reverse the direction of the ball to seal off the inlet aperture also increases. The second method of increasing the flow is to increase the travel of the ball. Allowing the ball to move further away from the seat will increase the conical flow area, but it also means response time will increase. Neither of these methods provide variable flow.

Ball check valves have been previously disclosed in U.S. Pat. No. 1,613,145; U.S. Pat. No. 2,308,876; U.S. Pat. No. 4,018,247; and U.S. Pat. No. 4,253,524. These non-analogous patents pertain to a casing string of an oil well, a high speed gas compressor, and high pressure reciprocating oil well pumps. While the earliest of these patents was issued in 1927, known hydraulic tensioners have not included a variable flow ball check valve for a timing chain or timing belt assembly. It is believed that this lack of adaptation is due to the difficulty in designing a cost effective package to contain and control a plurality of balls in a small, compact, lightweight configuration.

SUMMARY

Current hydraulic tensioners use a check valve having a singular check valve ball to control the unidirectional flow of oil into a high pressure chamber of a tensioner. In certain tensioner applications it may be beneficial to vary the stiffness of the piston. The check valve for a hydraulic tensioner according to the invention encompasses a plurality of check valve balls to overcome these limitations and allow for variable flow which will improve the performance of the hydraulic tensioner. To overcome the limitation of current technology, the multiple ball check valve of the invention incorporates the use of a plurality of check valve balls in unique patterns of size, allowable ball travel, and biasing spring forces to achieve variable flow at different inlet fluid pressures as a means of changing piston stiffness. Using multiple smaller and lighter check valve balls can achieve the same or greater flow as one large check valve ball. Additionally, if the proper number of check valve balls is selected, the travel of the balls can be reduced. Since the mass of each ball is greatly reduced, as well as the travel distance, the response time to seal off the fluid inlet is improved. The multiple ball check valve provides a cost effective design to contain and control the plurality of balls in a small, compact, lightweight configuration.

A variable flow check valve can include a housing defining an inlet passage communicating with a plurality of valve seats, and a ball-guiding passage adjacent each valve seat. A plurality of balls, corresponding in number to the plurality of valve seats with one ball for each valve seat. Each ball can be received within a corresponding ball-guiding passage of the housing for reciprocal movement with respect to the corresponding valve seat. Each ball can normally be biased toward the corresponding valve seat. At least two of the plurality of balls can have at least one different fluid flow characteristic selected from a group including a different ball size, a different allowable ball travel distance, and a different ball biasing force.

A method of manufacturing a variable flow check valve according to the invention can include forming a plurality of valve seats in at least one preform. A housing can be formed to define an inlet passage communicating with a plurality of valve seats and a ball-guiding passage adjacent each valve seat. A plurality of balls can be inserted into the housing; one ball for each valve seat. Each ball can be received within the corresponding ball-guiding passage for reciprocal movement with respect to the corresponding valve seat. The plurality of balls can normally be biased toward the corresponding valve seat. At least two of the plurality of balls can have at least one different fluid flow characteristic selected from a group including a different ball size, a different allowable ball travel distance, and a different ball biasing force.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

The term "belt" or "chain", as used interchangeably herein, is any power transmission member forming an endless loop and constructed of flexible material or of articulated rigid links to permit the member to conform to a radius of curvature of a pulley or sprocket drive face and intended, in use, to be driven in an endless path; and, by contact with the pulley or sprocket drive face, to transmit power to or extract power from the pulley or sprocket. The term a "pulley" or "sprocket", as used interchangeably herein, is a device rotatable about an axis and having a drive face radially spaced from the axis of rotation for intended power transferring engagement with a belt or chain to drive the belt or chain on an endless path or to extract power from the belt or chain to drive an output load device. The term "guide roll" as used herein is a device rotatable about an axis and having a belt or chain-contacting face radially spaced from the axis of rotation for intended engagement with the belt or chain to aid in directing the belt or chain along an intended path of travel. A guide roll, as distinguished from a pulley or sprocket, is not intended to provide driving power to, or extract power from, a belt or chain. The term "tensioning arm" as used herein is a member other than a pulley or sprocket engageable with a belt or chain, and which is adjustable or relatively movable with respect to the belt or chain in a direction which causes an increase or decrease in tensile stress in the belt or chain or a take-up or any undesirable belt or chain slack to maintain a desirable drive traction between the belt or chain and the pulley or sprocket drive face. A tensioning arm, as distinguished from a guide roll, has a non-rotatable face portion for contacting the belt or chain, whereby the belt or chain slides over the face portion of the tensioning arm. The term "hydraulic tensioner" or "tension drive mechanism" as used herein applies a force for actuating the tensioning arrangement and is derived from or transmitted via the exertion of force on a fluid.

Figure 1:
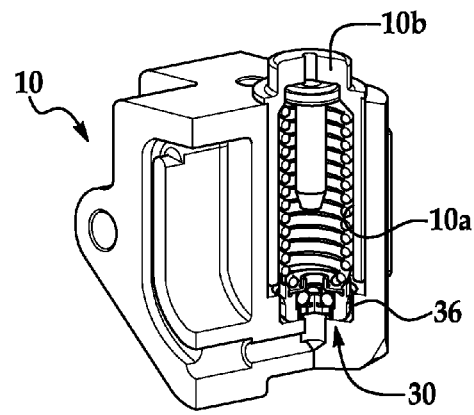
FIG. 1 is a cross sectional view of a high flow and quick response check valve for a hydraulic tensioner according to the present invention.
Figure 2:
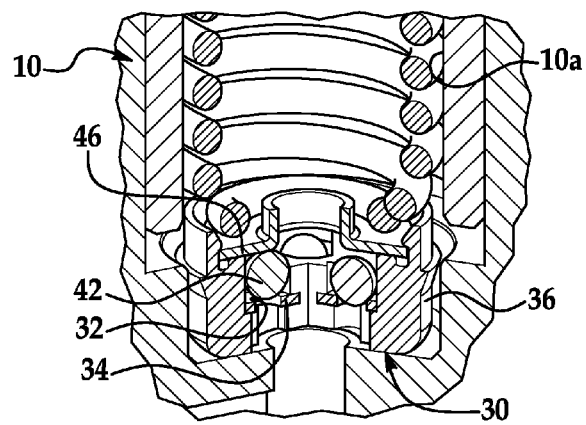
FIG. 2 is a detail cross sectional view of the high flow and quick response check valve of FIG. 1.
Figure 3:
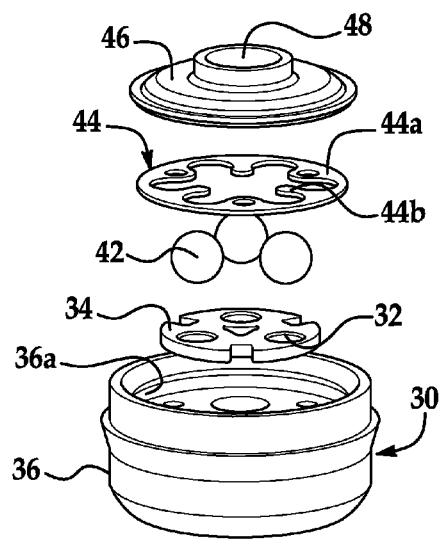
FIG. 3 is an exploded view of the high flow and quick response check valve of FIGS. 1-2.
Figure 4:
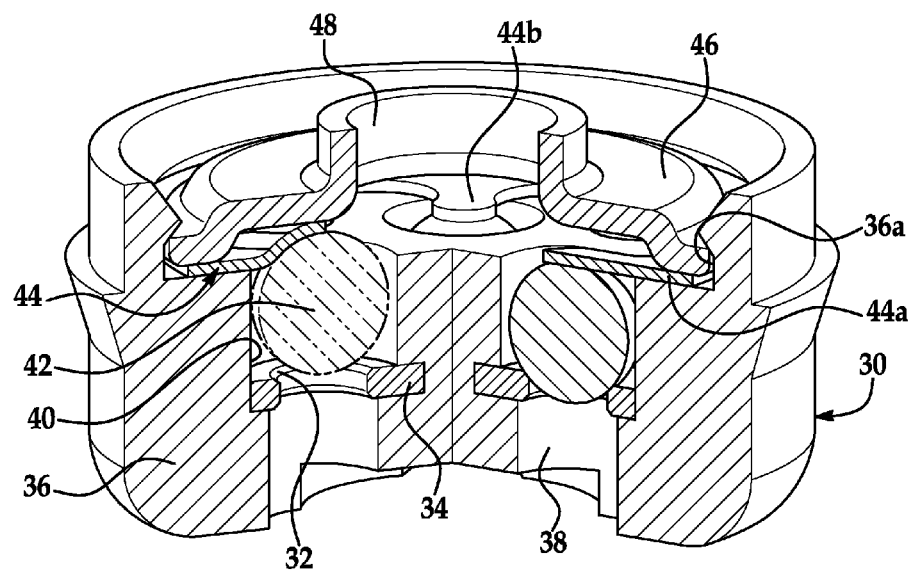
FIG. 4 is a detail cross sectional view of the high flow and quick response check valve of FIGS. 1-3.
Figure 5:
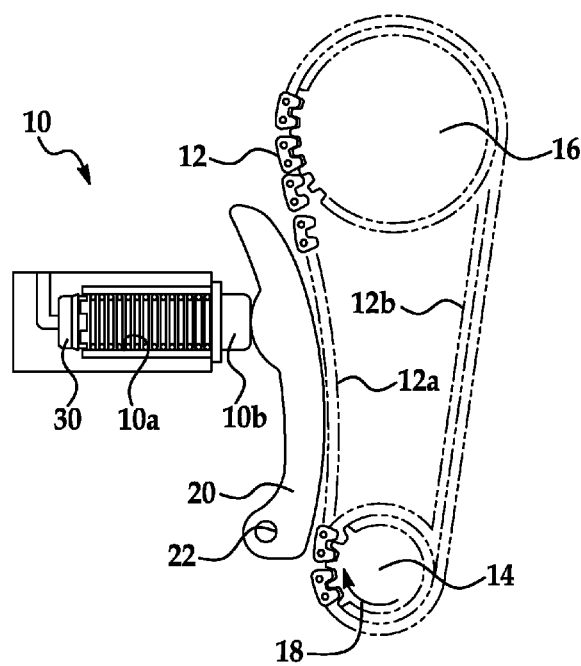
FIG. 5 is a simplified schematic of a hydraulic tensioner for an endless loop, flexible, power transmission member, such as a timing chain or timing belt, for an internal combustion engine, including a high flow and quick response check valve having a plurality of balls according to the present invention.

Referring now briefly to FIG. 5, a hydraulic tensioner 10 is schematically illustrated for an endless loop, flexible, power transmission member 12 for an internal combustion engine of a motor vehicle. The power transmission member 12 encircles a drive sprocket 14 driven by a drive shaft, such as a crank shaft of the engine, and at least one driven sprocket 16 supported from a driven shaft, such as a cam shaft of the engine. A guide roll can also be provided, if desired. The power transmission member 12 passes over the drive sprocket 14 and driven sprockets 16 to define a taut strand 12a and a slack strand 12b, when driven in rotation as shown by arrow 18. On the outside of at least one of the taut strand 12a and the slack strand 12b of the power transmission member 12, at least one tensioning arm 20 is positioned with a face assembly including a shoe for sliding engagement with the power transmission member 12. The tensioning arm 20 can rotate about pivot 22 in response to force exerted by the tension drive mechanism or hydraulic tensioner 10. Rotation of the tensioning arm 20 about the pivot 22 applies tension to the power transmission member 12 to remove excess slack. It should be recognized that the hydraulic tensioner 10 disclosed below can be used in other alternative configurations of tensioning arms without departing from the spirit or scope of the present invention, and that the illustrated configuration is by way of example only, and is not to be considered a limitation of the invention.

Referring now to FIGS. 1-4, an improvement of a variable flow check valve 30 for a hydraulic tensioner 10 is illustrated. The variable flow check valve 30 can include a plurality of valve seats 32 defined in at least one preform 34. A housing 36 can be formed over the at least one preform 34 to define an inlet passage 38 communicating with each valve seat 32, and a ball-guiding passage 40 adjacent each valve seat 32. A plurality of balls 42, corresponding in number to the plurality of valve seats 32 with one ball 42 for each valve seat 32, are provided. Each ball 42 can be received within the corresponding ball-guiding passage 40 of the housing 36 for reciprocal movement toward and away from the associated valve seat 32. At least one biasing member or spring 44 can be provided for biasing the plurality of balls 42 normally toward a seated position (shown in solid line in FIG. 4) against the valve seat 32 and moveable to an unseated or open position (shown in phantom line in FIG. 4). A retainer 46 can be engageable with the housing 36 to capture the plurality of balls 42 and the at least one biasing spring 44 within the housing 36.

The at least one preform 34 can be formed of a stamped sheet metal material. The housing 36 can be formed of an injection molded plastic. The housing 36 can also define a retainer-receiving recess 36a. The retainer 46 can be snapped within the retainer-receiving recess 36a of the housing 36 to capture the plurality of balls 42 and the at least one biasing spring 44 within the housing 36. The retainer 46 can be formed of a stamped sheet metal material. The retainer 46 can define an outlet passage 48 in fluid communication with the inlet passage 38 through the plurality of valve seats 32 of the at least one preform 34 and the ball-guiding passages 40 of the housing 36.

The at least one biasing member or spring 44 can include at least one compression coil spring or at least one stamped reed spring. The at least one biasing member or spring 44 can be formed of a stamped sheet metal material to define a peripheral hub 44a with a plurality of radially extending fingers 44b, where each finger 44b defines a ball-engaging reed spring. The stamped reed spring can be "tuned" (i.e. a desired operation of the check valve can be determined and attained) by adjusting the thickness and geometry of the reed spring. The stamped reed spring configuration can provide simpler packaging than compared to a single or multiple compression springs.

A method of manufacturing a variable flow check valve 30 can include forming a plurality of valve seats 32 in at least one preform 34. A housing 36 can be formed by molding over the at least one preform 34 to define an inlet passage 38 communicating with each valve seat 32, and a ball-guiding passage 40 adjacent each valve seat 32. A plurality of balls 42 can be inserted into the housing; one ball 42 for each valve seat 32. Each ball 42 can be received within the corresponding ball-guiding passage 40 for reciprocal movement toward and away from the associated valve seat 32. The plurality of balls 42 can be biased toward a seated position against the associated valve seat 32 with at least one biasing spring 44. The at least one biasing spring 44 and the plurality of balls 42 can be retained within the housing 36 with a retainer 46.

The method can also include providing a sheet of metal material, and stamping the plurality of valve seats 32 and the at least one preform 34 from the sheet of metal material. The housing 36 can be molded of plastic material formed over the at least one preform 34. A retainer-receiving recess 36a can be formed in the housing 36. The retainer 46 can be snapped within the retainer-receiving recess 36a of the housing 36 to capture the plurality of balls 42 and the at least one biasing spring 44 within the housing 36. The retainer 46 can be stamped from a sheet of metal material. An outlet passage 48 in the retainer 46 for fluid communication with the inlet passage 38 through the plurality of valve seats 32 of the at least one preform 34 and the ball-guiding passages 40 of the housing 36.

The method can further include the at least one biasing member or spring 44 formed as at least one compression coil spring or at least one reed spring stamped from a sheet of metal material. The at least one biasing member or spring 44 can be formed of a stamped sheet metal material to define a peripheral hub 44a with a plurality of radially extending fingers 44b, where each finger 44b defines a ball-engaging reed spring. The stamped reed spring can be "tuned" (i.e. a desired operation of the check valve can be determined and attained) by adjusting the thickness and geometry of the reed spring. The stamped reed spring can be assembled within the housing 36 and held in place by the retainer 46.

In operation, the variable flow check valve 30 controls the unidirectional flow of hydraulic oil into a high pressure chamber 10a of a hydraulic tensioner 10. The multiple balls 42 of the check valve 30 can provide variable flow to improve the performance of the hydraulic tensioner 10. By way of example and not limitation, referring now to curve 100 of FIG. 6, as pressure increases beyond the ball biasing force of at least one of the balls of check valve 30, hydraulic oil flows through the at least one ball of the check valve 30 and into a high pressure chamber 10a of the tensioner 10 as the piston 10b extends to take up slack in the power transmission member 12. As pressure continues to increase beyond the ball biasing force of another ball of the check valve 30, hydraulic oil flows through at least two balls of the check valve 30 and into a high pressure chamber 10a of the tensioner 10 as the piston 10b extends to take up slack in the power transmission member 12. As pressure continues to increase even further beyond the ball biasing force of a third ball of the check valve 30, hydraulic oil flows through three balls of the check valve 30 and into a high pressure chamber 10a of the tensioner 10 as the piston 10b extends to take up slack in the power transmission member 12. As the power transmission member 12 begins to push the piston 10b back into the hydraulic tensioner 10, the oil wants to flow back out of the check valve 30. At this point, the plurality of balls 42 in the check valve 30 move back to the seated position in reverse sequence against the corresponding valve seats 32 formed in the at least one preform 34 to seal off the oil inlet passage 38. The use of a plurality of check valve balls 42 to provide variable flow overcomes the deficiencies of a single ball check valve configuration. Using multiple smaller and lighter check valve balls 42 can achieve the same or greater flow as one large check valve ball. Additionally, the travel distance of the balls 42 can be reduced. Since the mass of each ball 42 is greatly reduced, as well as the travel distance, the response time to seal off the oil inlet is improved. Accordingly, the invention can provide a cost effective design to contain and control the plurality of balls 42 in a small, compact, lightweight configuration check valve 30.

Variable flow can be achieved by providing at least two of the plurality of balls 42 with at least one different fluid flow characteristic selected from a group including a different ball size, a different allowable ball travel distance, and a different ball biasing force. These characteristics can be different on a singular basis or in any permissible combination thereof By way of example and not limitation, the at least one different fluid flow characteristic can include: at least two of the plurality of balls 42 having different sizes or diameters; or at least two of the plurality of balls 42 having different allowable ball travel distances; or at least two of the plurality of balls 42 having different ball biasing forces applied thereto; or in combination at least two of the plurality of balls 42 having different sizes and different allowable ball travel distances; or in combination at least two of the plurality of balls 42 having different sizes and different ball biasing forces applied thereto; or in combination at least two of the plurality of balls 42 having different allowable ball travel distances and different ball biasing forces applied thereto; or in combination at least two of the plurality of balls 42 having different sizes, different allowable ball travel distances, and different ball biasing forces applied thereto. By varying these characteristics or parameters, individually and in any permissible combination, an infinite number of curves having different flow to pressure characteristics can be produced to meet any particular application design requirement.

Figure 6:
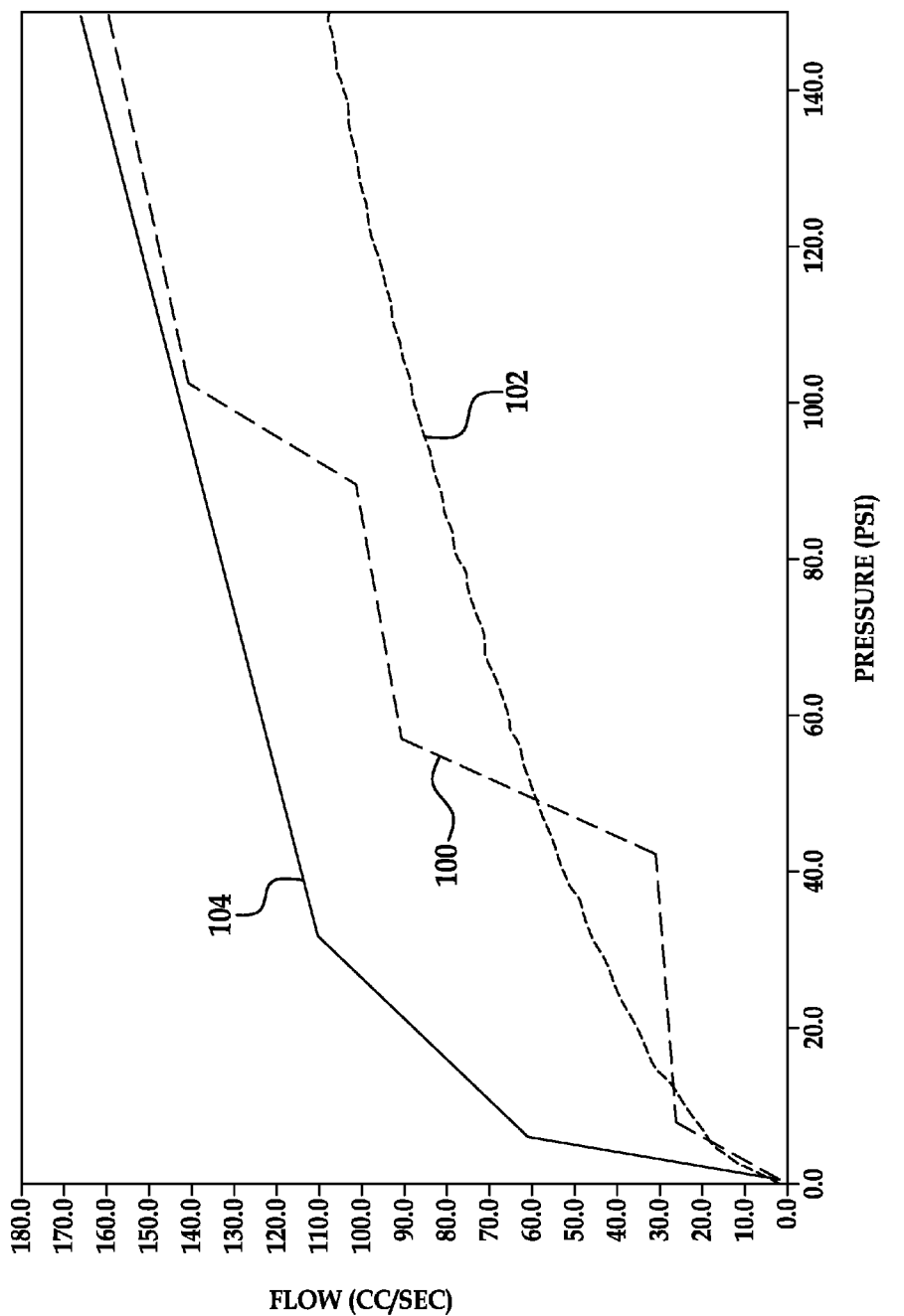
FIG. 6 is a graph illustrating flow (cc/sec) versus pressure (psi) with a curve corresponding to a single ball check valve, a curve corresponding to a high flow multiple ball check valve, and a curve corresponding to a variable flow multiple ball check valve.

Referring again to FIG. 6, by way of example and not limitation, a graph compares flow (cc/sec) versus pressure (psi) for a single ball check valve in curve 102, a high flow/quick response multiple ball check valve (having three balls of uniform ball size, uniform ball travel distance, and uniform biasing force applied thereto) in curve 104, and a variable flow multiple ball check valve (having at least two balls 42 of non-uniform size, and/or non-uniform ball travel distance, and/or non-uniform biasing force applied thereto) in curve 100 according to the invention disclosed. It should be recognized that the flow versus pressure graph curves illustrated can be different from that depicted depending on the number of balls 42 selected, the ball size selected for each ball 42, the allowable ball travel distance selected for each ball 42, and the biasing force to be applied selected for each ball 42. By way of example and not limitation, as depicted in FIG. 6 in curve 100, each ball 42 is tuned to pop-off at a different pressure with unique flow characteristics.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A variable flow check valve (30) comprising:
   a housing (36) defining an inlet passage (38) communicating with a plurality of valve seats (32), and a ball-guiding passage (40) adjacent each valve seat (32); and
   a plurality of balls (42) corresponding in number to the plurality of valve seats (32), one ball (42) for each valve seat (32), each ball (42) received within the ball-guiding passage (40) of the housing (36) for reciprocal movement with respect to the corresponding valve seat (32) and normally biased toward the corresponding valve seat (32), at least two of the plurality of balls (42) having at least one different fluid flow characteristic selected from a group including a different ball size, a different allowable ball travel distance, and a different ball biasing force.

2. The variable flow check valve (30) of claim 1 further comprising:
at least one preform (34) defining the plurality of valve seats (32) and formed of a stamped sheet metal material.

3. The variable flow check valve (30) of claim 1 further comprising:
the housing (36) formed of a molded plastic material.

4. The variable flow check valve (30) of claim 1 further comprising:
at least one biasing member (44) biasing the plurality of balls (42) toward the corresponding valve seats (32);
the housing (36) defining a retainer-receiving recess (36a); and
a retainer (46) snapped within the retainer-receiving recess (36a) of the housing (36) to capture the plurality of balls (42) and the at least one biasing spring (44) within the housing (36).

5. The variable flow check valve (30) of claim 1 further comprising:
at least one biasing spring (44) formed of a stamped sheet metal material to define a peripheral hub with a plurality of radially extending fingers, each finger defining a ball-engaging reed spring.

6. The variable flow check valve (30) of claim 1 further comprising:
a retainer (46) formed of a stamped sheet metal material and engageable with the housing (36) to capture the plurality of balls (42 within the housing (36).

7. The variable flow check valve (30) of claim 1 further comprising:
a retainer (46) defining an outlet passage (48) in fluid communication with the inlet passage (38) through the plurality of valve seats (32) and the ball-guiding passages (40) of the housing (36).

8. A method of manufacturing a variable flow check valve (30) comprising:
forming a housing (36) to define an inlet passage (38) communicating with a plurality of valve seats (32), and a ball-guiding passage (40) adjacent each valve seat (32);
inserting a plurality of balls (42) into the housing (36), one ball (42) for each valve seat (32), each ball (42) received within the ball-guiding passage (40) for reciprocal movement with respect to the corresponding valve seat (32), each of the plurality of balls (42) normally biased toward the corresponding valve seat (32); and
providing at least two of the plurality of balls (42) with at least one different fluid flow characteristic selected from a group including a different ball size, a different allowable ball travel distance, and a different ball biasing force.

9. The method of claim 8 further comprising:
providing a sheet of metal material; and
stamping at least one preform (34) with the plurality of valve seats (32) from the sheet of metal material.

10. The method of claim 8, wherein the housing (36) forming further comprises:
molding the housing (36) of plastic material over at least one preform (34) defining the plurality of valve seats (32).

11. The method of claim 8 further comprising:
forming a retainer-receiving recess (36a) in the housing (36); and
snapping the retainer (46) within the retainer-receiving recess (36a) of the housing (36) to capture the plurality of balls (42) within the housing (36).

12. The method of claim 8 further comprising:
providing a sheet of metal material; and
stamping the sheet of metal material to define a peripheral hub (44a) with a plurality of radially extending fingers (44b), each finger (44b) defining a ball-engaging reed spring.

13. The method of claim 8 further comprising:
providing a sheet of metal material; and
stamping a retainer (46) from the sheet of metal material; and
attaching the retainer (46) to the housing (36) to capture the plurality of balls (42) within the housing (36).

14. The method of claim 8 further comprising:
forming an outlet passage (48) in the retainer (46) for fluid communication with the inlet passage (38) through the plurality of valve seats (32) and the ball-guiding passages (40) of the housing (36).

15. In a hydraulic tensioner (10) for an endless, flexible, power transmission member (12) for an internal combustion engine of a motor vehicle, the improvement of a variable flow check valve (30) comprising:
a housing (36) defining an inlet passage (38) communicating with a plurality of valve seats (32), and a ball-guiding passage (40) adjacent each valve seat (32); and
a plurality of balls (42) corresponding in number to the plurality of valve seats (32), one ball (42) for each valve seat (32), each ball (42) received within the ball-guiding passage (40) of the housing (36) for reciprocal movement with respect to the valve seat (32) and normally biased toward the valve seat (32), at least two of the plurality of balls (42) having at least one different fluid flow characteristic selected from a group including a size of each ball, an allowable ball travel distance for each ball, and an amount of biasing force applied to each ball.

\* \* \* \* \*